(12) United States Patent
Alden

(10) Patent No.: US 8,457,557 B2
(45) Date of Patent: Jun. 4, 2013

(54) WIRELESS SYNCHRONIZATION MECHANISM

(75) Inventor: Richard P Alden, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 0 days.

(21) Appl. No.: 12/811,081

(22) PCT Filed: Apr. 23, 2010

(86) PCT No.: PCT/US2010/032210
§ 371 (c)(1),
(2), (4) Date: Jun. 28, 2010

(87) PCT Pub. No.: WO2010/124190
PCT Pub. Date: Oct. 28, 2010

(65) Prior Publication Data
US 2012/0128172 A1    May 24, 2012

Related U.S. Application Data

(60) Provisional application No. 61/172,600, filed on Apr. 24, 2009.

(51) Int. Cl.
*H04B 7/00*    (2006.01)

(52) U.S. Cl.
USPC ........................................ 455/41.2; 455/550.1

(58) Field of Classification Search
USPC ................ 455/41.1, 41.2, 41.3, 550.1, 562.1, 455/575.7, 90.3
See application file for complete search history.

(56) References Cited

U.S. PATENT DOCUMENTS

| | | | |
|---|---|---|---|
| 6,424,820 B1 | 7/2002 | Burdick | |
| 6,938,100 B2 | 8/2005 | Kang | |
| 7,016,334 B2 | 3/2006 | Cohen | |
| 7,039,033 B2 | 5/2006 | Haller | |
| 7,142,814 B2 | 11/2006 | Nassimi | |
| 7,149,551 B2 | 12/2006 | Kim | |
| 7,155,163 B2 | 12/2006 | Cannon | |
| 7,187,768 B1 | 3/2007 | Papadopoulos | |
| 7,254,367 B2 | 8/2007 | Helden | |
| 2002/0103008 A1 | 8/2002 | Rahn | |
| 2002/0165006 A1 | 11/2002 | Haller | |

(Continued)

FOREIGN PATENT DOCUMENTS

| | | |
|---|---|---|
| KR | 10-2007-0066025 | 6/2007 |
| KR | 10-2008-0044375 | 5/2008 |
| KR | 10-2008-0098273 | 11/2008 |

OTHER PUBLICATIONS

International Search Report and Written Opinion on PCT/US2010/032210 (Mailed Nov. 11, 2010).

*Primary Examiner* — Ping Hsieh
(74) *Attorney, Agent, or Firm* — Workman Nydegger

(57) ABSTRACT

A media delivery device that can automatically initiate and establish a secure wireless communication channel with an audio output device comprises a proximity module that recognizes a mutual engagement zone proximate to the media delivery device. The proximity module can detect when the audio output device is within the mutual engagement zone. Moreover, the media delivery device further comprises a communication module wherein upon the proximity module detecting the audio output device within the mutual engagement zone, the communication module automatically initiates and establishes a wireless communication channel with the audio output device. The media delivery device can then wirelessly communicate with the audio output device outside of the mutual engagement zone using the wireless communication channel.

45 Claims, 4 Drawing Sheets

U.S. PATENT DOCUMENTS

| | | |
|---|---|---|
| 2003/0017805 A1 | 1/2003 | Yeung |
| 2004/0203365 A1* | 10/2004 | Yamamoto et al. .......... 455/41.2 |
| 2005/0096071 A1 | 5/2005 | Lin |
| 2006/0035590 A1 | 2/2006 | Morris |
| 2006/0116107 A1 | 6/2006 | Hulvey |
| 2006/0166718 A1 | 7/2006 | Seshadri |
| 2006/0189348 A1 | 8/2006 | Montulli |
| 2006/0199536 A1 | 9/2006 | Eisenbach |
| 2006/0199538 A1 | 9/2006 | Eisenbach |
| 2006/0258408 A1 | 11/2006 | Tuomela |
| 2007/0004387 A1 | 1/2007 | Gadamsetty |
| 2007/0010288 A1 | 1/2007 | Willins |
| 2007/0042762 A1 | 2/2007 | Guccione |
| 2007/0087725 A1 | 4/2007 | Anderson |
| 2007/0093207 A1 | 4/2007 | Kim |
| 2007/0141989 A1 | 6/2007 | Flinchem |
| 2007/0149122 A1 | 6/2007 | Murphy |
| 2007/0197164 A1 | 8/2007 | Sheynman |
| 2007/0202807 A1* | 8/2007 | Kim ............................ 455/41.2 |
| 2008/0014869 A1 | 1/2008 | Demirbasa |
| 2008/0026695 A1 | 1/2008 | Choi |
| 2008/0039017 A1 | 2/2008 | Kim |
| 2008/0057868 A1 | 3/2008 | Chang |
| 2008/0057890 A1 | 3/2008 | McKillop |
| 2008/0058023 A1 | 3/2008 | Seshadri |
| 2008/0076389 A1 | 3/2008 | Lee |
| 2008/0090524 A1 | 4/2008 | Lee |
| 2008/0102793 A1 | 5/2008 | Ananthanarayanan |

* cited by examiner

WIRELESS SYNCHRONIZATION MECHANISM

BACKGROUND

1. Field of the Invention

The present disclosure generally relates to synchronization of wireless devices and, in particular, to the synchronization of a wireless media delivery device to one or more wireless audio output devices.

2. Background and Relevant Art

The development and recent improvements of wireless technology has dramatically increased the popularity of wireless devices. For example, wireless technology may now be found in a wide-range of products, including cellular phones, media players, computer hardware devices, and automobiles. Common household appliances are even incorporating wireless technology. There is little doubt that wireless technology will have various additional applications in the future as wireless technology continues to advance.

The popularity of wireless technology may stem from the added versatility created when a traditional wired device is transformed into a wireless device. For example, a wireless keyboard and mouse may allow a user to control a computer from virtually anywhere in a room, without the hassle or hazard of a wire. Another example that demonstrates the advantages of wireless technology is wireless headphones. For example, a user may place a wireless enabled media player in a backpack or pocket and use wireless headphones to enjoy the media without the bother of a wire pulling and/or swinging around the user's body. Thus, the wireless technology may increase the user's enjoyment and experience when compared to a traditional wired device.

As part of the growing wireless revolution, the BLUETOOTH wireless protocol has become a standard wireless protocol for providing short range (10 yards or less) wireless networks. Some reasons for the success of the BLUETOOTH protocol may be the fact that a BLUETOOTH enabled device operates in a 2.4 GHz frequency band, which may allow for high bandwidth and provide multiple simultaneous connections. Another reason for BLUETOOTH'S popularity is the protocol's ability to generate a secure wireless connection.

To generate a secure wireless connection, wireless enabled devices may first have to perform a synchronization process. For example, the synchronization process generally may include three steps. First, a wireless device may search for other wireless devices. Second, upon detection of another wireless device, both wireless devices may trade a security code, such as a PIN (Personal Identification Number), to establish an initial link. Third, the devices may generate an encrypted wireless connection using a symmetric encryption key created and stored in both devices.

Although a secure wireless connection may be advantageous, the process to generate a secure wireless connection has conventionally been problematic. For example, the synchronization process may be cumbersome and require a user to manually enter PINs, codes, keys, and/or other information. Moreover, any time the wireless device connects to a different wireless device, a user may have to repeat the entire synchronization process. Thus, the synchronization process generally causes frustration to users who want to connect wireless devices quickly and easily.

Conventional attempts to improve the cumbersome synchronization process are less than ideal. For example, some conventional methods may allow wireless devices to automatically share PINs upon detecting another wireless device within the wireless signal range. This conventional synchronization process may be easier, but the ease comes at the expense of the security of the wireless network by allowing unwanted devices to eavesdrop on the resultant wireless network.

To combat the eavesdropping problem, other conventional synchronization methods may require a cumbersome process to power down the device and, in some cases, the user may need to completely remove the device's batteries. The power down process seeks to synchronize devices in a low power state, i.e., a weak signal state, such that only devices within a close proximity may synchronize. Although this method partially addresses the eavesdropping problem, the method again creates a cumbersome synchronization process each time a user wishes to synchronize wireless devices.

Other conventional synchronization processes include buttons that may be added to a wireless device. The inclusion of a synchronization button may add bulk to the wireless device, making the device heavier and unattractive. In other examples, the button may be so small that the user may have a difficult time accessing and pressing the button with certainty. Moreover, a button still may require a user to manually synchronize the wireless devices, adding time and hassle to the synchronization process.

Finally, conventional methods of synchronization may not alert the user as to when the synchronization process is complete and/or when the wireless devices achieve a secure wireless connection. Without an alert, the user may depress a button before the synchronization process is complete, which may interrupt the synchronization process. Thus, a user may need to make several synchronization attempts before achieving an actual secure wireless connection.

These conventional methods increase the time it takes to synchronize wireless devices, thereby increasing the frustration of the wireless device user, while decreasing the user's enjoyment of the wireless device. Accordingly, there are a number of disadvantages in the conventional art of wireless synchronization.

BRIEF SUMMARY

Implementations of the present invention provide systems, methods and devices configured to synchronize wireless devices effortlessly, reliably, and securely. For example, implementations of the invention provide wireless devices that allow a user to securely synchronize two or more wireless devices without having to enter PINs, codes, or keys, or complete a complicated or tedious synchronization process. For example, a user can synchronize two wireless devices for the first time, and any subsequent time, with the single act of bringing the two wireless devices within a mutual engagement zone. Thus, a user can more fully enjoy the wireless devices without the hassle typically associated with synchronizing the wireless devices.

In one example implementation, a wirelessly enabled media delivery device includes a proximity module that recognizes a mutual engagement zone within a predetermined distance from the media delivery device. The proximity module can detect when an audio output device is within the mutual engagement zone. Moreover, the media delivery device can further include a communication module, wherein upon the proximity module detecting the audio output device within the mutual engagement zone, the communication module initiates and establishes a wireless communication channel with the audio output device. The media delivery device can then wirelessly communicate with the audio output device outside of the mutual engagement zone using the wireless communication channel.

Similarly, in another implementation, an audio output device can automatically initiate and establish a secure wireless communication channel with a media delivery device. The audio output device can include a proximity module that recognizes a mutual engagement zone that is within a predetermined distance from the audio output device. The proximity module can detect when the media delivery device is within the mutual engagement zone. The audio output device can further include a communication module, wherein upon the proximity module detecting the media delivery device within the mutual engagement zone, the communication module initiates and establishes a wireless communication channel with the media delivery device. The audio output device can then wirelessly communicate with the media delivery device outside of the mutual engagement zone using the wireless communication channel.

Implementations of the invention also include methods of synchronizing wireless devices. For example, a method used from the perspective of the media delivery device involves detecting that an audio output device is within a mutual engagement zone of the media delivery device. Also, the method involves sending synchronization information to the audio output device. In addition, the method can involve receiving a synchronization response from the audio output device that enables the media delivery device and the audio output device to establish a secure wireless communication channel. The wireless communication channel can have a wireless communication range that is larger than the mutual engagement zone. Furthermore, the method involves communicating with the audio output device through the established wireless communication channel outside of the mutual engagement zone and within the wireless communication range.

In another example from the perspective of the audio output device, a method involves detecting that a media delivery device is within a mutual engagement zone of the audio output device. The method can also involve sending synchronization information to the media delivery device. In addition, the method can involve receiving a synchronization response from the media delivery device that enables the audio output device and the media delivery device to establish a secure wireless communication channel. The wireless communication channel can have a wireless communication range that is larger than the mutual engagement zone. Furthermore, the method can involve communicating with the media delivery device through the established wireless communication channel outside of the mutual engagement zone and within the wireless communication range.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific example implementations thereof which are illustrated in the appended drawings. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Figure 1A:
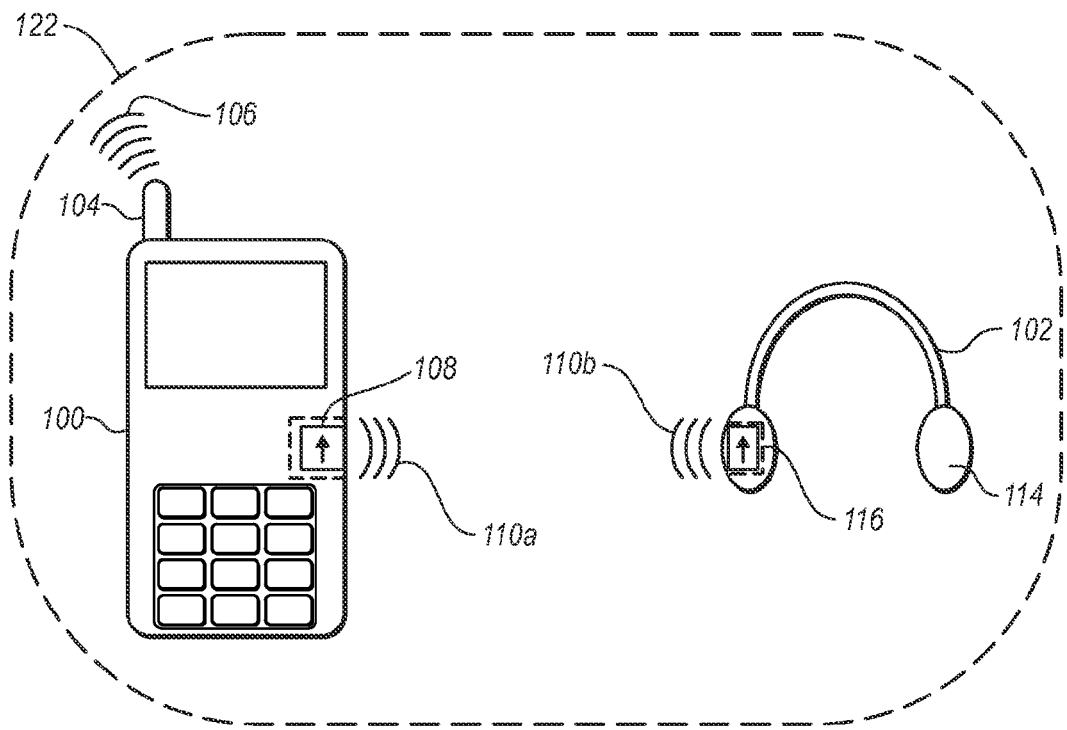
FIG. 1A illustrates example wireless devices within a wireless range but outside a mutual engagement zone according to one implementation of the invention.

Implementations of the present invention provide systems, methods and devices configured to synchronize wireless devices effortlessly, reliably, and securely. For example, implementations of the invention provide wireless devices that allow a user to securely synchronize two or more wireless devices without having to enter PINs, codes, or keys, or complete a complicated or tedious synchronization process. For example, a user can synchronize two wireless devices for the first time, and any subsequent time, with the single act of bringing the two wireless devices within a mutual engagement zone. Thus, a user can more fully enjoy the wireless devices without the hassle typically associated with synchronizing the wireless devices.

As will be appreciated more fully herein, implementations of the present invention allow a user to quickly and efficiently synchronize two or more wireless devices. In particular, implementations of the invention allow a user to synchronize two or more wireless devices without having to manually input device PINs, codes, keys and/or other information into one or more of the wireless devices in order to synchronize the wireless devices. Thus, a user can securely synchronize one or more wireless devices in a time efficient manner that allows the user to quickly use a secure wireless communication channel between the two or more wireless devices.

Moreover, implementations of the invention also provide an easy, failsafe, and intuitive synchronization process between two or more wireless devices. In one implementation, for example, a user does not need to press a button, input information, or power down the wireless devices in order to synchronize the wireless devices. In one example implementation, a user simply positions the two or more wireless devices within a predetermined distance from one another to synchronize the wireless devices and create a wireless communication channel. Thus, a user may easily synchronize the wireless devices in environments where traditional methods would have made synchronization difficult or impossible.

Although implementations of the invention provide an efficient and intuitive synchronization process of two or more wireless devices, the synchronization process remains secure. In particular, implementations of the invention do not permit a particular wireless device to synchronize or connect with unknown or unwanted wireless devices, even when the unknown or unwanted devices are within the communication range of the particular wireless device. Thus, implementations of the invention provide a synchronization process that creates a secure wireless communication channel and significantly reduces the ability of unwanted devices to eavesdrop on the wireless communication channel.

In addition, implementations of the present invention can provide wireless devices that are slimmer and sleeker. In particular, example implementations of the invention do not necessarily require bulky synchronization buttons, a data input interface, or other traditional synchronization features that tend to make wireless devices larger and bulkier. Thus, implementations of the invention allow wireless devices to be smaller and sleeker providing manufacturers/designers with greater versatility in creating and designing wireless devices with not only improved functional features, but also improved aesthetics.

FIG. 1A illustrates one implementation of the invention that can be practiced with a media delivery device 100 and an audio output device 102. In addition to the media delivery device 100 and audio output device 102, implementations of the invention can incorporate various other types of wireless enabled devices. For example, other wireless enabled devices can include personal handheld devices, cell phones, telephones, computers, computer hardware, printers, medical devices, household appliances, global satellite positioning devices, video game controllers, or any other wireless communication device.

In addition to the wide-range of wireless enabled devices that can incorporate implementations of the present invention, when the wireless device is a media delivery device 100 the type of media delivery device can vary. For example, FIG. 1A illustrates one example of the media delivery device 100 as a cell phone that includes not only media delivery capabilities, but also telecommunications capability. Therefore, the media delivery device 100 can include a telecommunication antenna 104 that sends and receives telecommunication signals 106.

In other example implementations, the media delivery device 100 can be an MP3 player, CD/DVD player, satellite radio, broadcast radio, or any other portable media delivery device. In addition to portable media delivery devices, other example implementations of the media delivery device can include a car stereo, home stereo, portable stereo, desktop or laptop computer, television, home theater system, DJ equipment, video game system, or any other portable or non-portable media delivery device.

As with the media delivery device 100, the audio output device 102 can vary from one implementation to the next. FIG. 1A illustrates one example of the audio output device 102 with an over-the-head headphone configuration including speaker assemblies 114. In other implementations, for example, the audio output device 102 can take the form of an ear piece, ear buds (in-the-ear headphones), small personal speakers, car speakers, home speakers, computer speakers, and even larger speakers, such as DJ speakers.

Regardless of the type of wireless enabled device, a manufacturer can choose to use almost any type of wireless protocol to create a wireless communication channel between two or more wireless enabled devices. For example, in one implementation, the wireless protocol can be a BLUETOOTH or similar protocol. The wireless protocol, however, can be almost any wireless protocol that allows for wireless communication.

In addition to, or depending on, the wireless protocol used to create a wireless communication channel, the wireless communication range 122 between the media delivery device 100 and the audio output device 102 can also vary. Generally, the wireless device with the shortest wireless communication capability determines the wireless communication range 122. For example, the wireless communication capability of the audio output device 102 can determine the wireless communication range 122. In one example, the wireless communication range 122 can be fairly short and within the range of about ten yards. In alternative implementations, the wireless communication range 122 can be much greater than ten yards.

Notwithstanding the type of wireless communication range 122, a manufacturer can configure the media delivery device 100 and the audio output device 102 to enable synchronization properties only when the media delivery device 100 and audio output device 102 are within a predetermined distance from one another. For example, a manufacturer can configure the media delivery device 100 and audio output device 102 to detect one another when a user positions the media delivery device 100 and the audio output device 102 within a mutual engagement zone 120 (see FIG. 1B).

In particular, to accomplish detection within the mutual engagement zone 120, FIG. 1A shows one example implementation where the media delivery device 100 and the audio output device 102 can each emit proximity signals 110a and 110b, respectively. The media delivery device 100 and the audio output device 102 can further include proximity modules 108 and 116, respectively, that can detect the proximity signals 110a and 110b. Thus, for example, a manufacturer can configure the media delivery device 100 and the audio output device 102 to automatically enable a synchronization process when the proximity modules 108 and 116 detect the proximity signals 110b and 110a, respectively.

In one implementation of the invention, the proximity modules 108 and 116 comprise one or more magnetic elements that produce magnetic fields that act as proximity signals 110a and 110b. In addition, as discussed more fully below with respect to FIG. 2, the proximity modules 108 and 116 can have magnetic field detectors that detect the presence of the proximity signals 110a and 110b, thereby allowing the media delivery device 100 and the audio output device 102 to detect when a user positions the two devices in the mutual engagement zone 120.

In other words, when a user positions the media delivery device 100 and the audio output device 102 in the mutual engagement zone 120, then the media delivery device's 100 proximity module 108 can detect the magnetic field proximity signal 110b produced from the audio output device's 102 proximity module 116. Similarly, when the devices are in the mutual engagement zone 120, the audio output device's 102 proximity module 116 can detect the magnetic field proximity signal 110a produced from the media delivery device's proximity module 108.

Figure 1B:
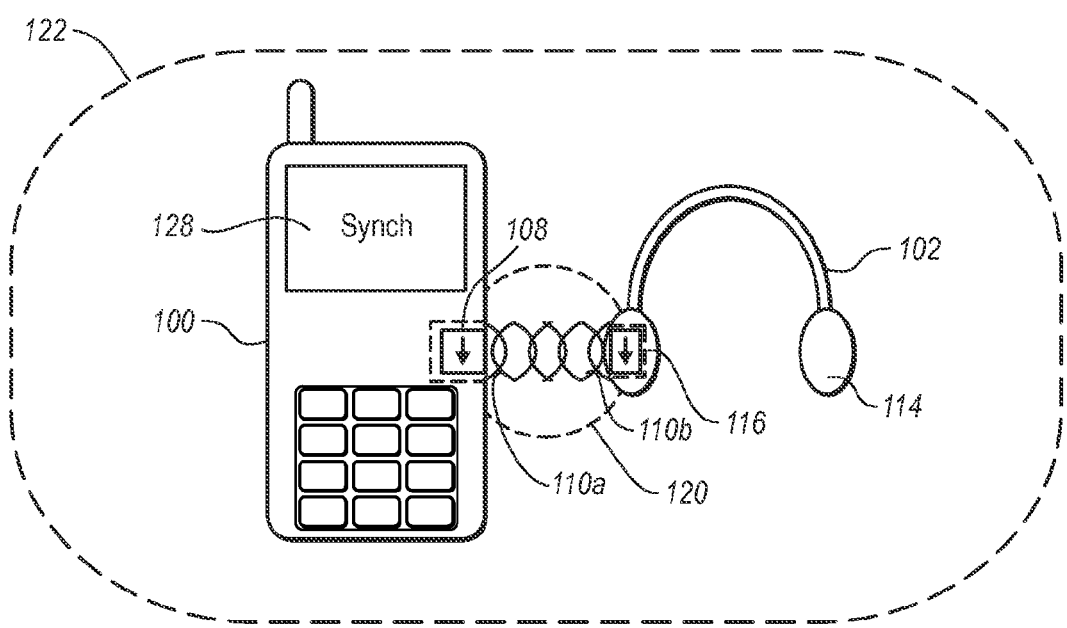
FIG. 1B illustrates example wireless devices within both a wireless range and a mutual engagement zone according to one implementation of the invention.
Figure 1C:
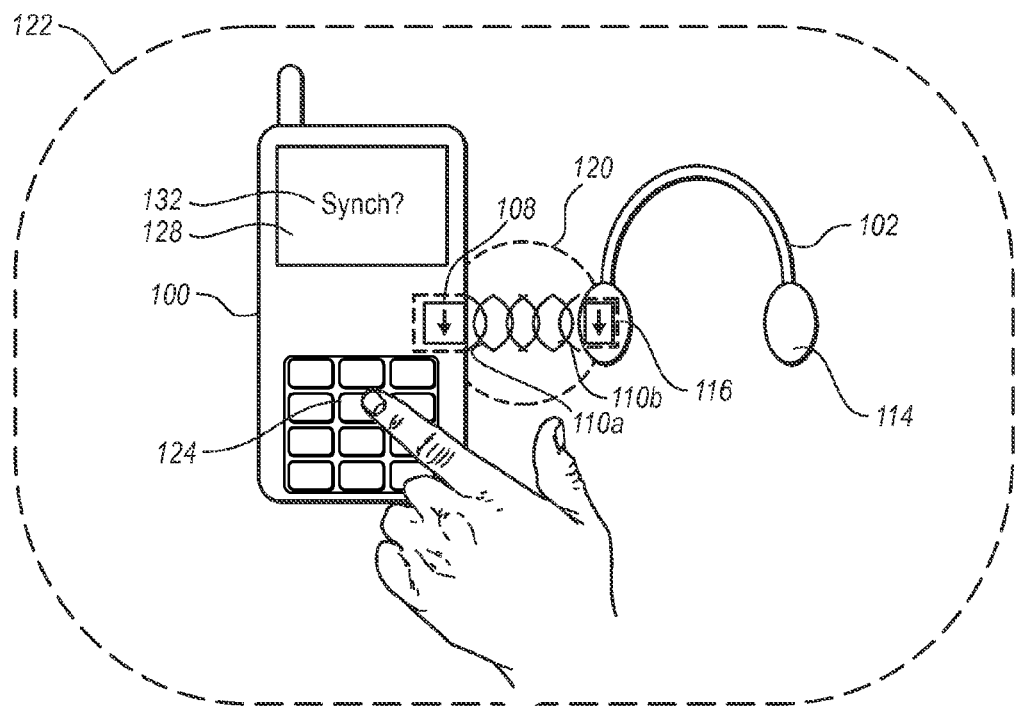
FIG. 1C illustrates example wireless devices prompting and receiving user confirmation.
Figure 1D:
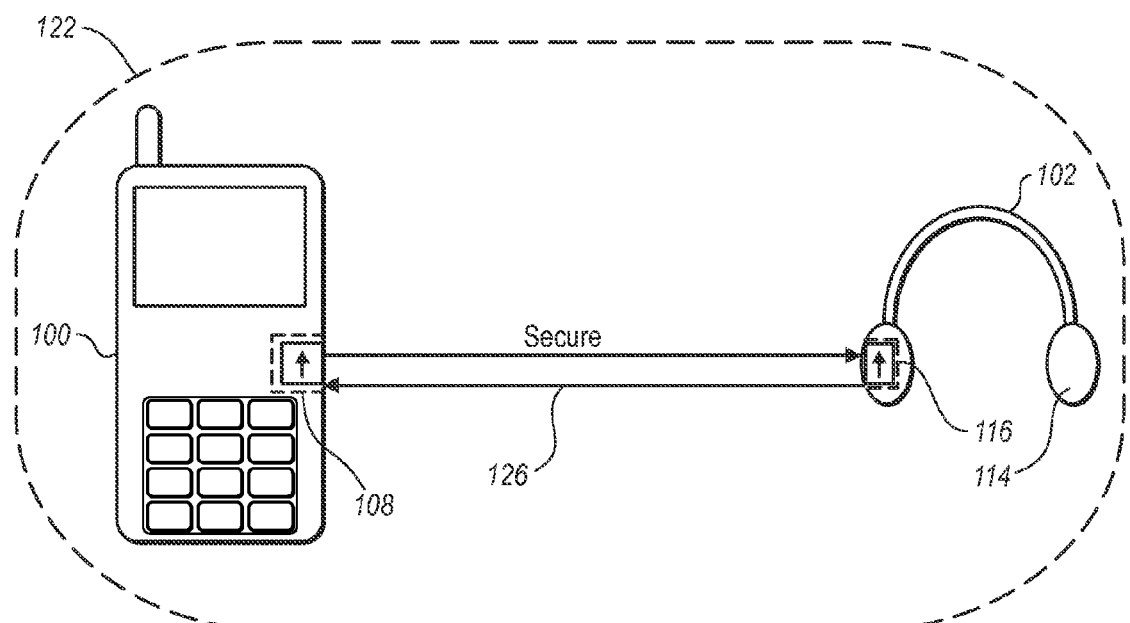
FIG. 1D illustrates example wireless devices connected in wireless communication through a wireless connection.

Once the proximity modules 108 and 116 detect that the media delivery device 100 and the audio output device 102 are within the mutual engagement zone 120, the media delivery device 100 and the audio output device 102 can automatically initiate a synchronization process that results in a wireless communication channel 126 (shown in FIG. 1D). Upon establishing the wireless communication channel 126, the media delivery device 100 and the audio output device 102 are free to wirelessly communicate anywhere within the wireless communication range 122. As discussed, the wireless communication capabilities of the devices define the wireless communication range 122, but in any event, the wireless communication range 122 is a substantially larger area than the mutual engagement zone 120 (e.g., the typical range for a BLUETOOTH connection—several feet).

In addition to magnetic elements and signals as described above, the proximity modules 108 and 116, along with the proximity signals 110a and 110b, can vary from one implementation to the next. In other example implementations, the proximity signals 110a and 110b and can include short-range infrared signals, and the proximity modules 108 and 116 can detect the short-range infrared signal. In another example, the proximity signals 110a and 110b can include weak sonar or radio signals at a particular frequency, and the proximity modules 108 and 116 can detect the sonar or radio signal at the particular frequency.

In general, the proximity signals 110a and 110b can be short range signals that the proximity modules 108 and 116 can detect to recognize when the media delivery device 100 and the audio output device 102 are within a predetermined proximity from one another, or within the mutual engagement zone 120. Various other forms of proximity signals are possible and are included within the scope of the invention.

Depending on the type or source of proximity signal, the proximity signals 110a and 110b can have various ranges. In one example, the range of the proximity signals 110a and 110b can have a range from about one inch to about one foot. In particular, one example implementation can include proximity signals that have a range of about three inches. In other examples, however, the proximity signals range can be less than about one inch or more than about one foot. In yet another example implementation, the range of the proximity signal can be variable and user defined depending on the desired range of the proximity signals 110a and 110b.

Furthermore, the ranges of the proximity signals 110a and 110b can vary one from another. Although FIG. 1A illustrates one example implementation where the range of the proximity signal 110a is substantially equal to the range of the proximity signal 110b, in other example implementations the media delivery device's 100 proximity signal 110a can have a different range than the audio output device's 102 proximity signal 110b. For example, the proximity signal 110a emitted from the media delivery device 100 can have a longer range relative to the range of the proximity signal 110b emitted from the audio output device 102.

As the ranges of the proximity signals 110a and 110b vary, characteristics of the mutual engagement zone 120 can also vary. For example, the size of the mutual engagement zone 120 can be small such that the mutual engagement zone 120 has a radius of less than about one inch. In one implementation, the size of the mutual engagement zone 120 can be such that the media delivery device 100 must physically contact the audio output device 102 in order to be within the mutual engagement zone. In other implementations, however, the mutual engagement zone can be larger with a radius of about one inch up to about one foot. In one particular implementation, the mutual engagement zone has a radius of about three inches.

Notwithstanding the variations in the proximity signals 110a and 110b emitted from the proximity modules 108 and 116 vary, other characteristics of the proximity modules 108 and 116 can vary. For example, the physical position of the proximity modules 108 and 116 within the media delivery device 100 and audio output device 102, respectively, can also vary. FIG. 1A shows one example implementation where the proximity module 108 can be located on a side of the media delivery device 100. In other implementations, however, the proximity module 108 can be located almost anywhere within the media delivery device 100, depending on space constraints within the media delivery device 100 and/or other variables.

Similarly, the location of the proximity module 116 of the audio output device 102 can vary. FIG. 1A shows the proximity module 116 located in the speaker assembly 114. In other implementations, the proximity module 116 can be located in the headband portion, or any other location in the audio output device 102 that can accommodate the proximity module 116.

Just as the location of the proximity modules 108 and 116 can vary, so too can the number of proximity modules vary within the media delivery device 100 and the audio output device 102. FIG. 1A illustrates an example media delivery device 100 and an example audio output device 102, each having a single proximity module 108 and 116, respectively. In other examples, the media delivery device and the audio output device can each have a plurality of proximity modules. For example, the media delivery device can have one proximity module on each of the four corners of the media delivery device. Likewise, the audio output device can have a proximity module on each of the speaker assemblies.

Returning to FIG. 1A, the figure illustrates an instance where a user positions the media delivery device 100 and the audio output device 102 within the wireless communication range 122. Although the user positions the media delivery device 100 and the audio output device 102 within the wireless communication range 122, the user has not positioned the media output device 100 and the audio output device 102 within the mutual engagement zone 120, as indicated by the fact that the media delivery device 100 is not within the range of the proximity signal 110b, nor is the audio output device 102 within the range of the proximity signal 110a. In one example, because the media delivery device 100 and the audio output device 102 are outside of the mutual engagement zone 120, the media delivery device 100 and the audio output device 102 are in a disabled state with respect to their synchronization capabilities (demonstrated by the upward pointing arrow in proximity modules 108 and 116).

Conversely, FIG. 1B illustrates an example when a user positions the media delivery device 100 and the audio output device 102 such that the proximity signals 110a and 110b are detectable by the proximity modules 116 and 108, respectively. In this case, the media delivery device 100 and the audio output device 102 are in an "engagement position" that forms a mutual engagement zone 120 of cross-over proximity signals 110a, 110b. For example, FIG. 1B shows that the mutual engagement zone 120 is a relatively close mutual position and/or orientation in which the media delivery device 100 and the audio output device 102 can detect the presence of one another. In one implementation, the media delivery device 100 and the audio output device 102 can both include physical indicia, that, when substantially aligned, correctly positions the media delivery device 100 and the audio output device 102 in the mutual engagement zone 120.

More specifically, FIG. 1B illustrates that, to initiate synchronization, a user can position the media delivery device 100 in close proximity to the audio output device 102, i.e., within the mutual engagement zone 120. When in the mutual engagement zone 120, the media delivery device 100 and the audio output device 102 can initiate a synchronization process, depicted by the reversal in the direction of the arrows in the proximity modules 108 and 116.

As discussed more fully below with respect to FIG. 2, for example, this can mean that, upon detecting that the media delivery device 100 and the audio output device 102 are within the mutual engagement zone 120, the proximity modules 108 and 116 can cause an electrical switch to open or close. This, in turn, can allow a signal to be sent to one or more modules handling wireless synchronization. Of course, other types of signaling mechanisms (e.g., based on impedance, or field strength) can be used.

Figure 2:
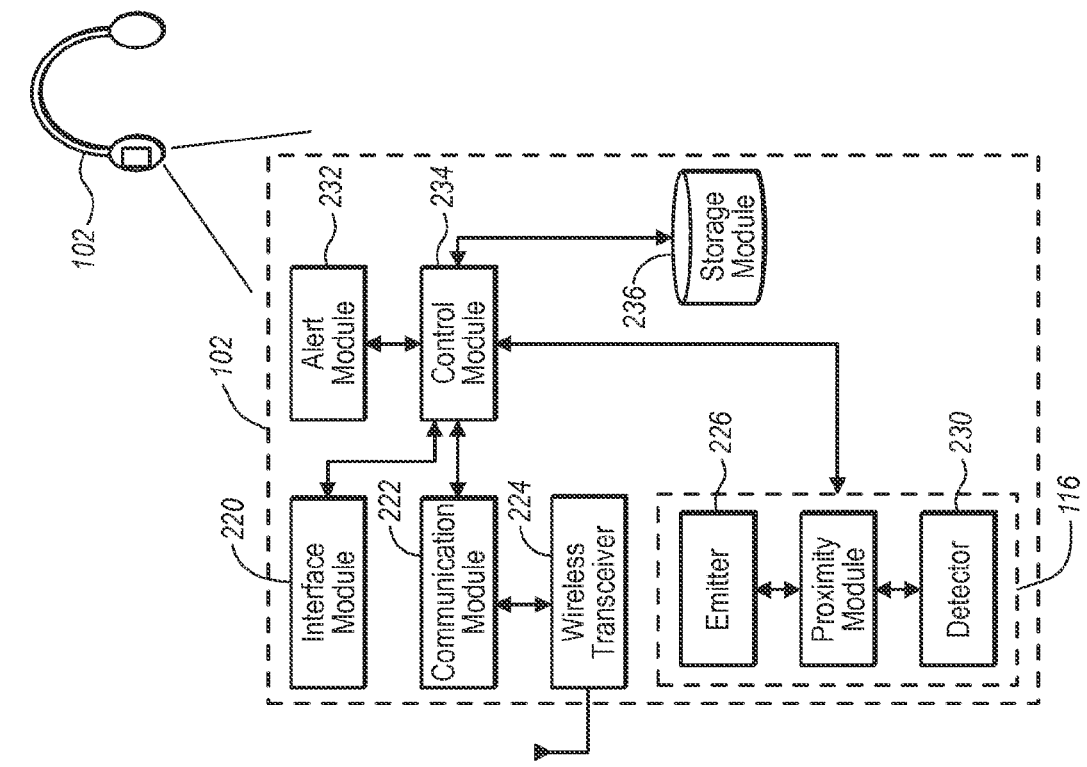
FIG. 2 illustrates an overview schematic diagram of a wireless synchronization system in accordance with one implementation of the present invention.
Figure 2:
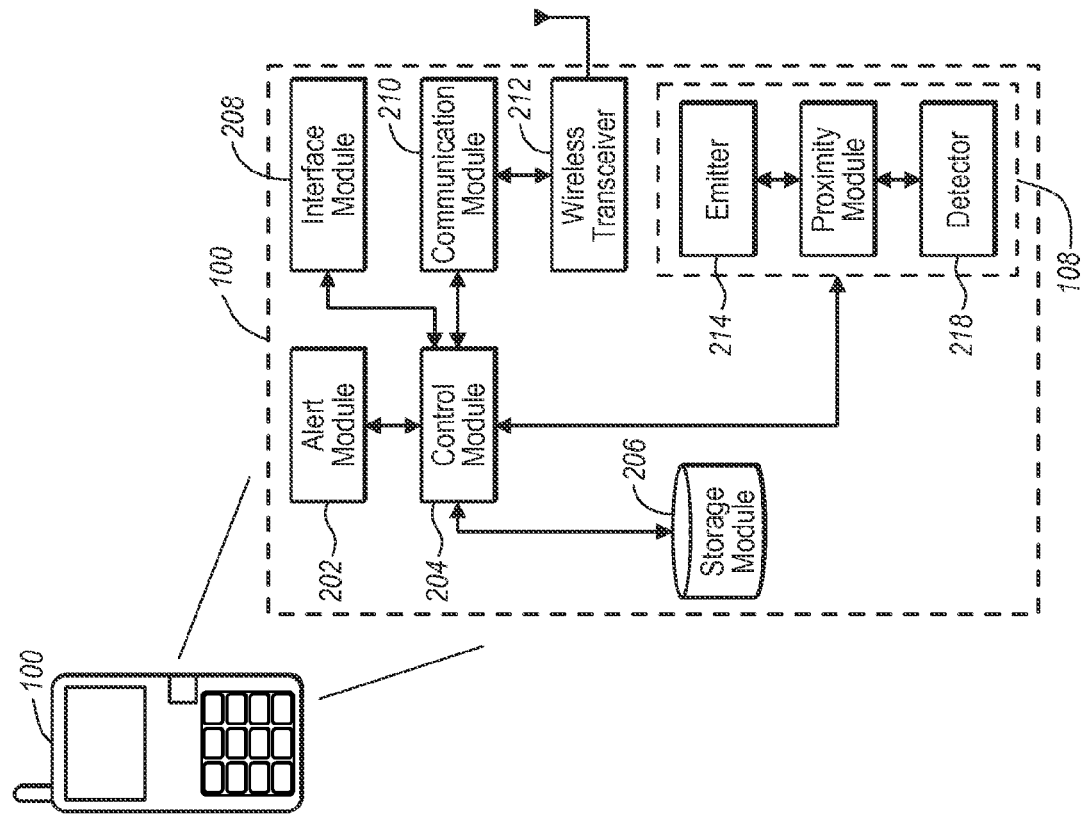

For example, as understood more fully with respect to FIG. 2, proximity modules 108 and 116 of the media delivery device 100 and audio output device 102 can one or more components in an electrical circuit coupled to the proximity detector to increase or reduce electrical impedance in the circuit. The magnetic element in each device may operate to close or impede the circuit by default, but, in proximity of the magnetic element in the other device, may open or reduce impedance of the circuit. Upon the current in the circuit opening, closing, or reaching (or being reduced to) a particular threshold current value (including disconnect of the circuit), the proximity modules 108, 116 can then initiate the synchronization process.

After the media delivery device 100 and audio output device 102 initiate synchronization, the media delivery device 100 and the audio output device 102 can include a synchronization indicator that indicates that the devices are in the process of synchronizing. For example, FIG. 1B illustrates the media delivery device 100 can include a display screen 128 that can indicate to a user that the media delivery device 100 is synchronizing with the audio output device 102. In one example, the display screen 128 can display text, such as "Synch," "Synching" or "Connecting." In other examples, the display screen 128 can display a symbol or animation to communicate that the media delivery device 100 is synchronizing with the audio output device 102. The audio output device 102 can also have a display screen, such as a small LCD panel, that displays similar text or symbols that indicate that the audio output device 102 is synchronizing.

In addition to a display screen 128, the media delivery device and/or audio output device can use other visual methods as a synchronization indicator. For example, the media delivery device 100 and/or the audio output device 102 can include a light source, such as a LED, that blinks while the devices are synchronizing. In other implementations, the light source can simply illuminate or change to a particular color that indicates the device is synchronizing.

In particular, implementations of the present invention can include one or more LEDs that can indicate synchronization status to the user. For example, in one implementation, one or more LEDs can illuminate with a predefined color when the wireless device is not synchronized with any device and is outside of the mutual engagement zone 120. Upon a user moving the wireless devices within the mutual engagement zone 120, one or more LEDs can change to different color to indicate to the user that the devices are within the mutual engagement zone 120. Once the synchronization process begins, the LEDs can blink, flash, or change color again to indicate to the user that synchronization of the wireless devices is in progress. In addition, once the wireless devices are synched, the LEDs can change to yet another color to indicate to the user that the wireless devices have established the wireless communication channel 126.

In addition, the LEDs can indicate to which devices a wireless device has established wireless communication channel 126. For example, in one implementation a user can establish a wireless communication channel 126 between more than two wireless devices, and in this instance, the LED lights can indicate to which device a the wireless device has established a wireless communication channel such that the user can know how multiple wireless devices are communicating with each other.

In particular, a user can establish a wireless communication channel between a cell phone and a set of headphones. Moreover, the user can establish a wireless communication channel between the same set of headphones and a media player. In this implementation, the headphones can include a LED light that illuminates with a first color when wirelessly communicating with the cell phone, and then illuminates with a second color when wirelessly communicating with the media player. Thus, the user can use the LED lights on the set of headphones to know with which device the headphones are communicating.

Not only can the synchronization indicators be visual, but other implementations of the invention can include audible synchronization indicators. For example, upon initiating the synchronization process, the media delivery device 100 and/or the audio output device 102 can beep, buzz, ring or otherwise produce an audible sound to indicate that the devices are synchronizing. In one implementation, the audible synchronization indicator is a recorded voice that says "Synching" or "Connecting."

Such an audible synchronization indicator can act as a security feature. For example, in the event that an unknown device attempts to synchronize with the media delivery device 100, the audible synchronization indicator could warn a user of the unknown device before the unknown device establishes a wireless communication channel with the media delivery device 100, thus allowing the user an opportunity to protect the media delivery device 100 from a possibly unwanted or dangerous connection. Other types of synchronization indicators can provide the same security benefit. For example, example implementations of the synchronization indictor can produce a vibration.

Notwithstanding the function or inclusion of a synchronization indicator, both the media delivery device 100 and the audio output device 102 can automatically initiate synchronization by transmitting and receiving synchronization data with one another to establish a wireless communication channel 126 upon a user placing the devices within the mutual engagement zone. In one example implementation, once the media delivery device 100 and the audio output device 102 initiate synchronization, the media delivery device 100 and the audio output device 102 automatically establish a wireless communication channel 126 (see FIG. 1D). In this example, besides the single step of moving the media delivery device 100 and the audio output device 102 within the mutual engagement zone 120, no additional user interaction is needed to initiate and complete synchronization and to establish the wireless communication channel 126.

In particular, although FIG. 1 shows that the media delivery device 100 includes a user interface, such as display screen 132 and button 124, a wireless device, according to at least some example implementations, does not necessarily include a user interface. For example, in at least one implementation, the wireless device does not include any user interface, and the synchronization process begins and establishes the wireless communication channel 126 without any additional user input. Thus, for example, a user can position the media delivery device 100 and the audio output device 102 within the engagement zone 120 for a specified period of time, the media delivery device 100 and the audio output device 102 can automatically start the synchronization process and establish the wireless communication channel 126 without any additional user interaction. Once the media delivery device 100 and the audio output device 102 have established the wireless communication channel, the medial delivery device 100 and/or audio output device 102 can buzz, vibrate, beep, illuminate a light, or otherwise provide an indication to the user that the devices have established the wireless communication channel 126.

By contrast, other implementations of the invention can include requiring additional human interaction in order to complete the synchronization process. Rather than requiring a user to enter a particular security code, however, or rather than selecting a particular wireless output device from a display screen, implementations of the present invention can use intuitive and relatively simple human interaction to complete the synchronization process once the media delivery device 100 and audio output device 102 are within the mutual engagement zone 120.

In one implementation, for example, the additional human interaction can involve physically holding the devices in the same position (e.g., within the mutual engagement zone 120) for a specific time interval, such as about 5 seconds, about 10 seconds, or about 15 seconds, etc. In other words, the synchronization process continues only if the user holds the position of media delivery device 100 and the audio output device 102 within the mutual engagement zone 120 for the specific time interval. If the user moves the media delivery device 100 and/or the audio output device 102 out of the mutual engagement zone 120 before the synchronization is complete (e.g., before the initial 5, 10, or 15 second interval), then the devices abort the synchronization process and do not establish a wireless communication channel.

In other implementations, the human interaction can involve requiring a user to acknowledge continuation of the synchronization process, such as by voice activation, or even push button activation. For example, FIG. 1C illustrates one example where the additional human interaction comprises a user pressing a button. In FIG. 1C, a user positions the media delivery device 100 and the audio output device 102 in the mutual engagement zone 120. At this point, before continuing with synchronization, the media delivery device 100 can prompt the user for confirmation that the user indeed wishes to synchronize the media delivery device 100.

For example, FIG. 1C illustrates that the media delivery device 100 can display a confirmation message 132 on the display screen 128 that prompts a user to confirm synchronization. To confirm, the user can simply press a button 124 to allow the media delivery device 100 to continue with synchronization. Thus, a user enables the synchronization capabilities of both devices by pressing the button while the two devices are within the mutual engagement zone 120 (depicted by the downward pointing arrows within the proximity modules 108 and 116).

Likewise, the audio output device 102 can require additional human interaction and, in some cases, both the media delivery device 100 and the audio output device 102 can require additional human interaction to continue with synchronization. For example, a user may need to hold synchronization buttons (not shown) on the respective devices while the devices are within the mutual engagement zone 120, and until such time as one or both of the devices play out an audible indicator, such as described above.

As shown in FIG. 1D, the synchronization process ultimately establishes the wireless communication channel 126. Upon establishing the wireless communication channel 126, the media delivery device 100 and/or the audio output device 102 can alert the user that the devices have established the wireless communication channel 126. For example, the media delivery device 100 and/or the audio output device 102 can beep, ring, buzz or give another audible alert. In other example implementations, the devices can have a light source that changes to a particular color, such as to green, or the device can simply produce a brief vibration.

After establishing the wireless communication channel 126, FIG. 1D shows that the media delivery device 100 and the audio output device 102 can wirelessly communicate through the wireless communication channel 126, including outside of the mutual engagement zone 120. For example, the media delivery device 100 can transmit audio media to the audio output device 102 such that the audio output device 102 plays the audio media through the speaker assembly 114 for the user to enjoy.

In addition to the media delivery device 100 transmitting data, the audio output device 102 can also transmit data. For example, the audio output device 102 can include an audio control panel (not shown) configured to request the media delivery device 100, through the wireless communication channel 126, to perform specific functions. In other words, the user can press a button on the audio output device 102 to control the media delivery device 100 using the wireless communication channel. For example, the user can place the media delivery device 100 in a pocket or backpack but still be able to play, stop, pause, or change a media track/channel on the media delivery device 100 by pressing buttons on the audio output device 102.

The media delivery device 100 and the audio output device 102 can continue to communicate through the wireless communication channel 126 so long as the media delivery device 100 and the audio output device 102 remain within the wireless communication range 122. Naturally, if a user moves the media delivery device 100 and/or the audio output device 102 outside of the wireless communication range 122, the wireless communication channel will disconnect.

Upon disconnection, in one implementation of the invention, the media delivery device 100 and the audio output device 102 can only reestablish the wireless communication channel if the user again positions them in the mutual engagement zone 120. In other example implementations, for example, the media delivery device 100 and the audio output device 102 store identification data about the previous wireless communication channel 126, thus allowing the media delivery device 100 and the audio output device 102 to reestablish the wireless communication channel 126 upon returning within the wireless communication range 122 (or by some other user interaction).

The automatic wireless communication channel reestablishment feature can be provided as a user option that the user can select. Conversely, a user can select an option that erases the stored identification data from previous wireless communication channels 126 when a user powers down the media delivery device 100 and/or the audio output device 102. Thus, in this implementation, once the media delivery device 100 and audio output device 102 establish the wireless communication channel 126, if the user chooses to power down one or both of the devices, then the user must position the media delivery device 100 and the audio output device 102 in the mutual engagement zone 120 to again synchronize the wireless devices.

The media delivery device 100 and the audio output device 102 can contain various components that facilitate the above described functions. For example, FIG. 2 illustrates an example schematic that shows example components of the media delivery device 100 and the audio output device 102. As mentioned above, the media delivery device 100 and the audio output device 102 comprise proximity modules 108 and 116, respectively. FIG. 2 illustrates that each proximity module 108 and 116 can have an emitter 214 and 226 and a detector 218 and 230, respectively. In some cases a single element, such as a magnetic element, can function as both an emitter and a detector, depending on the configuration. In general, however, the emitters 214 and 226 emit the proximity signals 110a and 110b, respectively, while the detectors 218 and 230 detect the proximity signals 110b and 110a, respectively.

For example, and as briefly discussed above, the emitters 214 and 226 can be magnetic elements that produce a detectable magnetic field. The magnetic elements can be a permanent magnet made from a natural magnetic material or a magnetized material. Alternatively, the magnetic element may be an electromagnet that exhibits magnetic properties when an electric current is applied to the material, but does not exhibit magnetic properties when the electric current is removed, thus allowing the proximity signals 110*a* and 110*b* to be turned on and off. Moreover, the emitters 214 and 226 can emit opposite polarized magnetic fields.

In order to detect the magnetic field, the detectors 218 and 230 can comprise magnetic field detection elements that can detect the magnet field produced from the emitters 214 and 226. In one implementation, the detectors are magnetometers that can measure the existence or strength of a magnetic field. For example, the magnetometers can measure the force of a magnetic field, or alternatively, measure a change in the magnetic field. Thus, the detectors 218 and 230 can detect when the emitters 214 and 226 located on the other device are within a certain range based on the measurement of the magnetic field or a specified change in the measurement of the magnetic field.

In one implementation, for example, the detectors 218 and 230 comprise and electrical circuit with a constant electrical current, the electrical circuit having a specified input voltage and a known output voltage. An example of such a circuit would be a typical voltage divider. The electric circuit can further comprise an inductor that stores energy in a magnetic field and causes the circuit to have inductance. When another magnetic field (i.e., such as the magnetic field from another device's emitter) interacts with the magnetic field surrounding the inductor, the inductance of the circuit changes, thus causing a change in the output voltage of the circuit. Upon the change in the output voltage of the circuit, the detector can send a signal to other modules to enable and/or perform the synchronization process.

Alternatively, in another example, the electrical circuit can have a constant voltage. Again, the electrical circuit can comprise an inductor such that when another magnetic field (i.e., the magnetic field from another device's emitter) interacts with the magnetic field surrounding the inductor, the inductance of the circuit changes, thus causing a change in the current of the circuit. Upon the change in the current, the detector can send a signal to the relevant modules that enable and/or perform the synchronization process.

In a further example implementation, the detectors 218 and 230 comprise magnetic elements that can be used to close a signaling switch so that, when activated, a signal travels to other modules that enable and/or perform the synchronization process. For example, the signaling switch can comprise an element biased to an open position. When another magnet (i.e., the magnet from another device's emitter) is positioned within a certain distance of the switch element, the magnetic field provides a force that closes the signaling switch, thus indicating that another device is within the mutual engagement zone 120.

Once the detectors 218 and 230 detect the signal generated from the emitters 226 and 214 respectively, the proximity modules 108 and 116 can communicate the detection with other modules within the media delivery device 100 and the audio output device 102. For example, FIG. 2 illustrates that the proximity modules 108 and 116 can be in communication with a control module 204 and 234, respectively. In particular, once the proximity modules 108 and 116 detect the proximity signals 100*a* and 100*b*, respectively, the control modules 204 and 234 can execute a set of computer-executable instructions that initiate the synchronization process.

For example, the computer-executable instructions can cause the control modules 204 and 234 to respectively direct alert modules 202 and 232 to produce an audible, visual, or vibration alert to a user to alert a user that the media delivery device 100 and audio output device 102 are within the engagement zone 120 and/or that the synchronization process is in progress. Similarly, the computer-executable instructions can cause the control modules 204 and 234 to respectively direct interface modules 208 and 220 to display a message, graphic, or animation on the display screen 128, as discussed above. The interface modules 208 and 220 can then request (and receive) user input to continue with the synchronization process, as described above.

In one example implementation, the control modules 204 and 234 are connected to communications modules 210 and 222, respectively, such that the computer-executable instructions can cause the control modules 204 and 234 to enable the communication modules 210 and 222 respectively. For example, the control modules 204 and 234 can permit and/or facilitate communication between the communication modules 210 and 222 and storage modules 206 and 236, respectively.

With access to the storage modules 206 and 236, the control modules 204 and 234 can retrieve stored synchronization data, as well as send synchronization data to the storage modules 206 and 236 for storage, such as synchronization encryption keys or codes. Thus, the control modules 204 and 234 can facilitate the passing of synchronization data from the storage modules 206 and 236 to the communication modules 210 and 222, and the communication modules 210 and 222 can facilitate the sharing of such synchronization data between the two devices.

For example, and as FIG. 2 illustrates, a manufacturer can connect the communication modules 210 and 222 to wireless transceivers 212 and 224, respectively. Thus, the communications modules 212 and 224 can transmit and receive synchronization data using a wireless connection. In other implementations, the communication modules 212 and 224 can connect to a receiver that is separate from a transmitter. Moreover, the configuration of the communication modules can use various protocols, frequencies, ranges, and transmitting speeds. The communication modules 210 and 22 can also communicate through a single wireless channel, or alternatively, the communication modules can communication through multiple wireless channels simultaneously.

Once the communication modules 210 and 222 share synchronization data, and the synchronization data is stored in the storage modules 206 and 236, for example, the synchronization process can complete by establishing a secure wireless communication channel 126 between the media delivery device 100 and the audio output device 102. In this way, the media delivery device 100 and audio output device 102 can transmit data wirelessly between the two devices, as described above.

Figure 3:
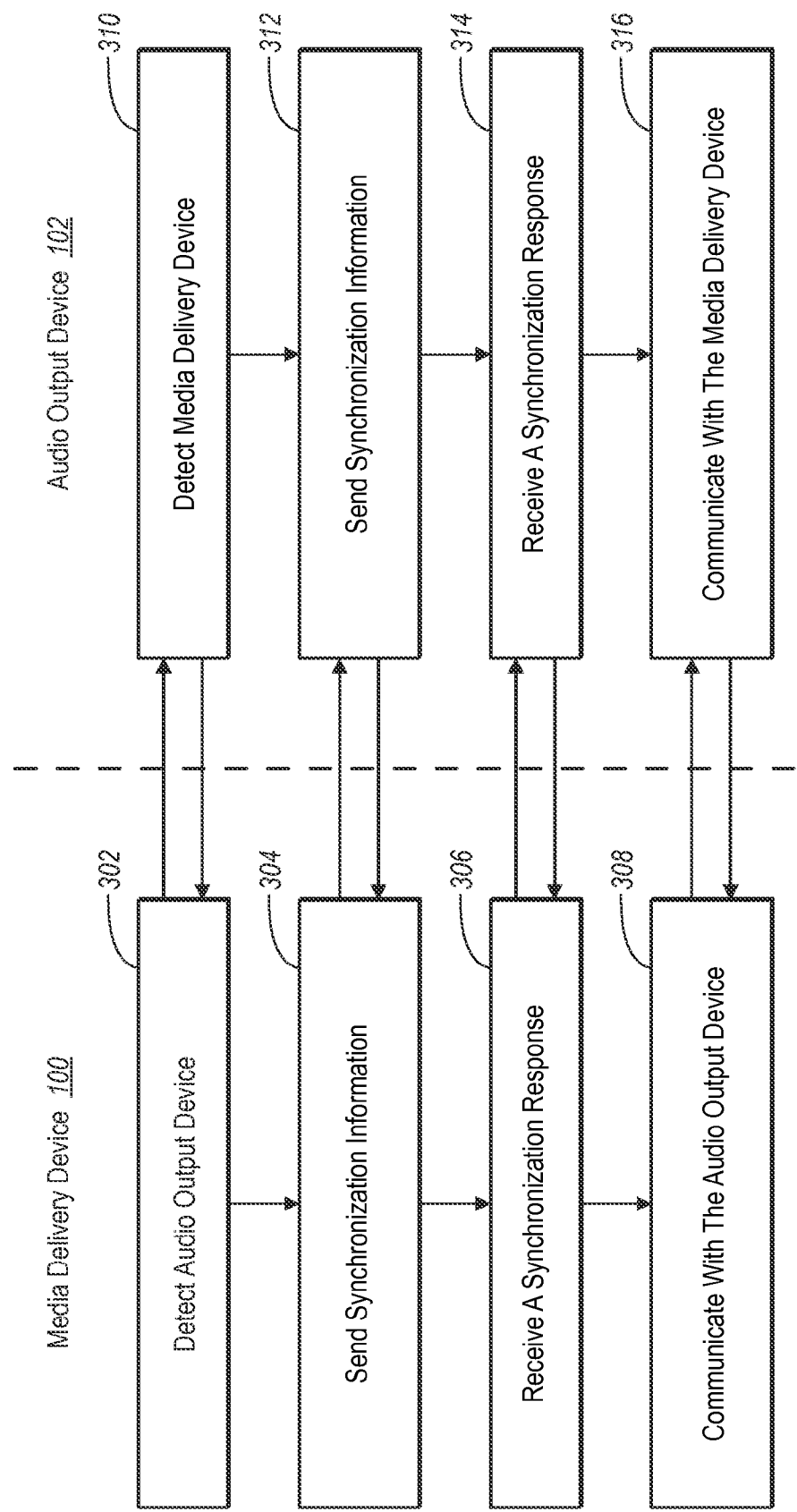
FIG. 3 illustrates methods of synchronizing a wireless device in accordance with one implementation of the present invention.

Accordingly, FIGS. 1A through FIG. 2 and the corresponding text provide a number of different components and modules that can efficiently synchronize and establish a wireless communication channel between wireless devices. In addition to the foregoing, implementations of the present invention can also be described in terms of flowcharts comprising one or more acts in a method for accomplishing a particular result. For example, FIG. 3 illustrates a method of efficiently establishing a wireless communication channel between a first device and a second device using minimal human interaction. The acts of FIG. 3 are discussed more fully below with respect to the components discussed with reference to FIG. 1A through FIG. 2.

For example, FIG. 3 shows that a method from the perspective of media delivery device 100 comprises an act 302 of detecting an audio output device. Act 302 includes detecting that an audio output device is within a mutual engagement zone of the media delivery device. For example, FIG. 1B shows that the proximity module 108 of the media delivery device 100 can detect the proximity signal 110b when the audio output device 102 is within the mutual engagement zone 120.

FIG. 3 also shows that the method comprises an act 304 of sending synchronization information. Act 304 includes sending synchronization information to the audio output device. For example, FIG. 2 shows an example schematic where the control module 204 can instruct the communication module 210 to initiate a wireless communication channel through a wireless transceiver 212 such that the media delivery device 100 can send synchronization information to the audio output device 102.

In addition, the FIG. 3 shows that the method comprises an act 306 of receiving a synchronization response. Act 306 includes receiving a synchronization response from the audio output device that enables the media delivery device and the audio output device to establish a secure wireless communication channel that has a wireless communication range that is larger than the mutual engagement zone. For example, FIG. 2 shows an example schematic where the communication module 210 can receive a synchronization response from the audio output device 102 through the wireless transceiver 212.

Furthermore, FIG. 3 shows that the method comprises an act 308 of communicating with the audio output device. Act 308 includes communicating with the audio output device through the established wireless communication channel outside of the mutual engagement zone and within the wireless communication range. For example, FIG. 1D illustrates the media delivery device 100 communicating with the audio output device 102 through the wireless communication channel 126 while the devices are with within the wireless communication range 122, but outside the mutual engagement zone 120.

Similarly, from the perspective of audio output device 102, FIG. 3 shows that the method comprises an act 310 of detecting a media delivery device. Act 310 can include detecting that a media delivery device is within a mutual engagement zone of the audio output device. For example, FIG. 1B shows that the proximity module 116 of the audio output device 102 can detect the proximity signal 110a when the media delivery device 100 is within the mutual engagement zone 120.

FIG. 3 also shows that the method from the perspective of audio output device 102 comprises an act 312 of sending synchronization information. Act 312 includes sending synchronization information to the media delivery device. For example, FIG. 2 shows an example schematic where the control module 234 can instruct the communication module 222 to initiate a wireless communication channel through a wireless transceiver 224 such that the audio output device 102 can send synchronization information to the media delivery device 100.

In addition, FIG. 3 illustrates that the method from the perspective of audio output device 102 can comprise an act 314 of receiving a synchronization response. Act 314 can include receiving a synchronization response from the media delivery device that enables the audio output device and the media delivery device to establish a secure wireless communication channel that has a wireless communication range that is larger than the mutual engagement zone. For example, FIG. 2 shows an example schematic where the communication module 222 can receive a synchronization response from the media delivery device 100 through the wireless transceiver 224.

Furthermore, FIG. 3 shows that the method from the perspective of audio output device 102 comprises an act 316 of communicating with the media delivery device. Act 312 includes communicating with the media delivery device through the established wireless communication channel outside of the mutual engagement zone and within the wireless communication range. For example, FIG. 1D illustrates the audio output device 102 communicating with the media delivery device 100 through the wireless communication channel 126 while the devices are with within the wireless communication range 122, but outside the mutual engagement zone 120.

Accordingly, the diagrams and text corresponding to FIG. 1 through FIG. 3 illustrate or otherwise describe a number of methods, devices, configurations, and components that can be used to establish a secure wireless communication channel between wireless devices. Such methods, devices, configurations, and components can provide a quick and effortless wireless synchronization process when compared to conventional devices and methods. Furthermore, implementations of the present invention provide a secure wireless communication channel that does not establish a wireless communication channel with unwanted or unknown wireless devices. Thus, implementations of the present invention can represent an effective, efficient, and secure means for synchronizing two wireless devices and establishing a wireless communication channel between the same, which synchronization means are much easier and more intuitive than conventional mechanisms.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A media delivery device configured to wirelessly communicate with one or more audio output devices within a wireless communication range, the media delivery device configured to automatically establish a secure, wireless communication channel with the one or more audio output devices within the wireless communication range based on proximity detection, comprising:
    a proximity module configured to recognize a mutual engagement zone that is proximate to the media delivery device and within the wireless communication range of one or more audio output devices;
    wherein the proximity module is configured to detect when the one or more audio output devices are within the mutual engagement zone; and
    a communication module configured to automatically initiate and establish the wireless communication channel with the one or more audio output devices when the one or more audio output devices are within the mutual engagement zone for a specified threshold time interval, and after the user has been prompted to acknowledge continuation of a synchronization process;
    wherein the media delivery device is configured to communicate with the one or more audio output devices outside of the mutual engagement zone using the established wireless communication channel.

2. The media delivery device as recited in claim 1, further comprising:
    one or more buttons corresponding to one or more other buttons on the one or more audio output devices;
    wherein the communications module is configured to automatically initiate and establish the wireless communication channel when:
        the proximity module detects the one or more audio output devices within the mutual engagement zone;
        a user activates the one or more buttons on the media delivery device; and
        the user activates the one or more other buttons on the one or more audio output devices.

3. The media delivery device as recited in claim 1, wherein the proximity module comprises an emitter element configured to emit a proximity signal.

4. The media delivery device as recited in claim 3, wherein the emitter element is a magnetic element that produces a magnetic field causing a signaling switch in the audio output device to open or close.

5. The media delivery device as recited in claim 3, wherein the emitter element is configured to emit the proximity signal over a short range infrared or radio signal.

6. The media delivery device as recited in claim 1, wherein the proximity module comprises a detector element configured to detect a magnetic field emitted from the one or more audio output devices.

7. The media delivery device as recited in claim 6, wherein the detector element is an electrical circuit designed to produce a change in output voltage upon interacting with a magnetic field emitted from the one or more audio output devices.

8. The media delivery device as recited in claim 6, wherein the detector element is a signaling switch configured to open or close upon interacting with a magnetic field emitted from the one or more audio output devices.

9. The media delivery device as recited in claim 1, further comprising an alert module that indicates a wireless communication channel has been established by producing a sensory alert.

10. The media delivery device as recited in claim 1, wherein the proximity module comprises a detector element configured to detect a short range infrared or radio signal.

11. An audio output device configured to wirelessly communicate with a media delivery device within a wireless communication range of the audio output device, the audio output device configured to automatically establish a secure, wireless communication channel with the media delivery device within the wireless communication range based on proximity detection, comprising:
    a proximity module configured to recognize a mutual engagement zone that is proximate to the audio output device and within the wireless communication range of the audio output device;
    wherein the proximity module is configured to detect when the media delivery device is within the mutual engagement zone; and
    a communication module configured to automatically initiate and establish the wireless communication channel with the media delivery device when the media delivery device is within the mutual engagement zone for a specified threshold time interval in response to a prompt to continue with synchronization;
    wherein the audio output device is configured to communicate with the media delivery device outside of the mutual engagement zone using the established wireless communication channel.

12. The audio output device as recited in claim 11, further comprising:
    one or more buttons corresponding to one or more other buttons on the media delivery device;
    wherein the communications module is configured to automatically initiate and establish the wireless communication channel upon detecting that:
        the media delivery device is within the mutual engagement zone; and
        one or more buttons on the audio output device and on the media delivery device have been activated at the same time.

13. The audio output device as recited in claim 11, wherein the proximity module comprises an emitter element configured to emit a proximity signal.

14. The audio output device as recited in claim 13, wherein the emitter element comprises a magnetic element that produces a magnetic field that causes a signaling switch in the media delivery device to open or close.

15. The audio output device as recited in claim 13, wherein the emitter element comprises one or more transmitters configured to emit the proximity signal over a short range infrared or radio signal.

16. The audio output device as recited in claim 11, wherein the proximity module comprises a detector element configured to detect a magnetic field emitted from the media delivery device.

17. The audio output device as recited in claim 16, wherein the detector element comprises an electrical circuit designed to produce a change in output voltage upon interacting with a magnetic field emitted from the media delivery device.

18. The audio output device as recited in claim 16, wherein the detector element comprises a signaling switch configured to open or close upon interacting with a magnetic field emitted from the media delivery device.

19. The audio output device as recited in claim 11, further comprising an alert module that indicates a wireless communication channel has been established by producing a sensory alert.

20. The audio output device as recited in claim 11, wherein the proximity module comprises one or more detector elements configured to detect one or more proximity signals emitted from the media delivery device over a short range infrared or radio signal.

21. A computerized device configured to wirelessly communicate with a second computerized device within a wireless communication range, the computerized device configured to automatically establish a secure, wireless communication channel with the second computerized device based on proximity detection, comprising:
  a proximity module configured to recognize a mutual engagement zone that is proximate to the computerized device and within the wireless communication range;
  wherein the proximity module is configured to detect one or more proximity signals emitted by a second computerized device and thereby identify that second computerized device is within the mutual engagement zone; and
  a communication module configured to automatically initiate and establish the wireless communication channel with the second computerized device when the second computerized device is within the mutual engagement zone, and a single human input is received after detection of the one or more proximity signals;
  wherein the computerized device is configured to communicate with the second computerized device outside of the mutual engagement zone using the established wireless communication channel.

22. The computerized device as recited in claim 21, further comprising:
  one or more buttons corresponding to one or more other buttons on the audio output device;
  wherein the communications module is configured to automatically initiate and establish the wireless communication channel when:
    the proximity module detects the one or more audio output devices within the mutual engagement zone;
    a user activates the one or more buttons on the media delivery device; and
    the user activates the one or more other buttons on the audio output device.

23. The computerized device as recited in claim 21, wherein the proximity module comprises an emitter element configured to emit the one or more proximity signals.

24. The computerized device as recited in claim 23, wherein the emitter element is configured to emit the proximity signal over a short range infrared or radio signal.

25. The computerized device as recited in claim 23, wherein the emitter element is a magnetic element that produces a magnetic field causing a signaling switch in the audio output device to open or close.

26. The computerized device as recited in claim 21, wherein the proximity module comprises a detector element configured to detect a magnetic field emitted from the audio output device.

27. The media delivery device as recited in claim 26, wherein the detector element is an electrical circuit designed to produce a change in output voltage upon interacting with a magnetic field emitted from the audio output device.

28. The media delivery device as recited in claim 26, wherein the detector element is a signaling switch configured to open or close upon interacting with a magnetic field emitted from the audio output device.

29. The media delivery device as recited in claim 21, further comprising an alert module that indicates a wireless communication channel has been established by producing a sensory alert.

30. In a media delivery device configured to wirelessly communicate with an audio output device within a wireless communication range, a computerized method of efficiently establishing a wireless communication channel between the media delivery device and the audio output device using minimal human interaction, comprising:
  detecting via one or more proximity signals that an audio output device is within a mutual engagement zone of the media delivery device;
  automatically prompting a user for additional human interaction;
  receiving an indication of a single human interaction in response to the prompt, wherein the single human interaction is received without the user entering any particular security code;
  sending synchronization information to the audio output device;
  receiving a synchronization response from the audio output device that enables the media delivery device and the audio output device to establish a secure wireless communication channel that has a wireless communication range that is larger than the mutual engagement zone; and
  communicating with the audio output device through the established wireless communication channel outside of the mutual engagement zone and within the wireless communication range.

31. The method recited in claim 30, wherein receiving the indication of the single human interaction further comprises identifying that one or more buttons on the media delivery device and the audio output device have been activated while the audio output device is positioned within the mutual engagement zone.

32. The method recited in claim 30, further wherein the single human interaction confirms that the user desires to continue synchronizing between the media delivery device and the audio output device.

33. The method recited in claim 32, wherein the one or more proximity signals are communicated over a short range infrared or radio signal.

34. The method recited in claim 32, wherein:
  the one or more proximity signals comprises a magnetic field strength; and
  the signaling switch opens or closes in response to a force provided by the magnetic field.

35. The method recited in claim 30, wherein detecting that the audio output device is within the mutual engagement zone further comprises opening or closing a signaling switch in response to the one or more proximity signals received from the media delivery device.

36. The method recited in claim 30, wherein the one or more proximity signals are communicated over a short range infrared or radio signal.

37. The method recited in claim 30, wherein the single human interaction comprises a physical user interaction with the media delivery device.

38. The method recited in claim 30, wherein the physical user interaction comprises a physical depression by the user on the media delivery device.

39. In an audio output device configured to wirelessly communicate with media delivery device within a wireless communication range, a computerized method of efficiently establishing a wireless communication channel between the audio output device and the media delivery device using minimal human interaction, comprising:
- detecting that a media delivery device is within a mutual engagement zone of the audio output device and that a user has satisfied a challenge to continue with a synchronization process, and without the user entering any particular security code;
- sending synchronization information to the media delivery device;
- receiving a synchronization response from the media delivery device that enables the audio output device and the media delivery device to establish a secure wireless communication channel that has a wireless communication range that is larger than the mutual engagement zone; and
- communicating with the media delivery device through the established wireless communication channel outside of the mutual engagement zone and within the wireless communication range.

40. The method recited in claim 39, further comprising identifying that one or more buttons on the audio output device and the media delivery device have been have been activated in response to the challenge while the media delivery device is positioned within the mutual engagement zone.

41. The method recited in claim 39, wherein detecting that the media delivery device is within the mutual engagement zone further comprises opening or closing a signaling switch in response to the one or more proximity signals received from the audio output device.

42. The method recited in claim 41, wherein the one or more proximity signals are communicated over a short range infrared or radio signal.

43. The method recited in claim 41, wherein:
- the one or more proximity signals comprise a magnetic field strength; and
- the signaling switch opens or closes in response to a force provided by the magnetic field.

44. The method recited in claim 39, wherein detecting that user has satisfied a challenge comprises identifying a physical user interaction with the audio output device.

45. The method recited in claim 39, wherein the physical user interaction comprises a physical depression by the user on the audio output device.

\* \* \* \* \*